(12) United States Patent
Le Roux et al.

(10) Patent No.: US 10,577,251 B2
(45) Date of Patent: Mar. 3, 2020

(54) COMPOSITION CONTAINING SYNTHETIC MINERAL PARTICLES AND A PROCESS FOR PREPARING THE COMPOSITION

(71) Applicants: CENTRE NATIONAL DE LA RECHERCHE SCIENTIFIQUE (C.N.R.S.), Paris (FR); UNIVERSITE PAUL SABATIER (TOULOUSE III), Toulouse (FR)

(72) Inventors: Christophe Le Roux, Avignonet Lauragais (FR); Francois Martin, Sainte Foy d'Aigrefeuille (FR); Pierre Micoud, Peyssies (FR); Angela Dumas, Pechabou (FR)

(73) Assignees: CENTRE NATIONAL DE LA RECHERCHE SCIENTIFIQUE (C.N.R.S.), Paris (FR); UNIVERSITE PAUL SABATIER (TOULOUSE III), Toulouse (FR)

( * ) Notice: Subject to any disclaimer, the term of this patent is extended or adjusted under 35 U.S.C. 154(b) by 0 days.

(21) Appl. No.: 15/840,901

(22) Filed: Dec. 13, 2017

(65) Prior Publication Data
US 2018/0105431 A1   Apr. 19, 2018

Related U.S. Application Data

(62) Division of application No. 14/131,076, filed as application No. PCT/FR2012/051594 on Jul. 6, 2012, now Pat. No. 9,884,769.

(30) Foreign Application Priority Data

Jul. 7, 2011   (FR) ...................................... 11 02144

(51) Int. Cl.
   *C01B 33/24*   (2006.01)
   *C01B 33/20*   (2006.01)
   (Continued)

(52) U.S. Cl.
   CPC .............. *C01B 33/24* (2013.01); *C01B 33/20* (2013.01); *C01B 33/22* (2013.01); *C01B 33/38* (2013.01);
   (Continued)

(58) Field of Classification Search
   CPC ......... C01B 33/24; C01B 33/20; C01B 33/22; C01B 33/28; C01B 33/38
   See application file for complete search history.

(56) References Cited

U.S. PATENT DOCUMENTS

| 4,942,026 A | 7/1990 | Gupta et al. |
| 6,761,865 B1 | 7/2004 | Gallup et al. |

(Continued)

FOREIGN PATENT DOCUMENTS

| FR | 2802913 | 6/2001 |
| WO | 2008/009799 | 1/2008 |
| WO | 2008/009800 | 1/2008 |

OTHER PUBLICATIONS

Chabrol et. al., Functionalization of synthetic talc-like phyllosilicates by alkoxyorganosilane grafting, Journal of Materials Chemistry, 20, 9695-9706 (Year: 2010).*

(Continued)

*Primary Examiner* — James A Fiorito
(74) *Attorney, Agent, or Firm* — Young & Thompson

(57) ABSTRACT

A composition comprising synthetic mineral particles, such as silicate or phyllosilicate mineral particles, is presented. The composition can be prepared by a process in which a hydrogel precursor of the synthetic mineral particles is produced by a coprecipitation reaction between at least one compound comprising silicon, such as sodium metasilicate, and at least one compound comprising at least one metal element, such as a dicarboxylate salt of the formula $M(R_1\text{—}COO)_2$, wherein $R_1$ is H or an alkyl group having 1 to 4

(Continued)

carbon atoms. The coprecipitation reaction also takes place in the presence of at least one carboxylate salt of formula $R_2$—COOM' wherein M' is Na or K, and $R_2$ is H or an alkyl group having 1 to 4 carbon atoms.

20 Claims, 3 Drawing Sheets

(51) Int. Cl.
*C01B 33/22* (2006.01)
*C01B 33/38* (2006.01)

(52) U.S. Cl.
CPC ...... *C01P 2002/72* (2013.01); *C01P 2002/78* (2013.01); *C01P 2002/82* (2013.01)

(56) References Cited

U.S. PATENT DOCUMENTS

| | | |
|---|---|---|
| 2001/0042704 A1 | 11/2001 | Lacombe et al. |
| 2009/0233107 A1 | 9/2009 | Yamada et al. |
| 2009/0252963 A1 | 10/2009 | Martin et al. |
| 2009/0253569 A1 | 10/2009 | Martin et al. |
| 2009/0261294 A1 | 10/2009 | Martin et al. |

OTHER PUBLICATIONS

International Search Report, dated Oct. 9, 2012, from corresponding PCT application.

\* cited by examiner

COMPOSITION CONTAINING SYNTHETIC MINERAL PARTICLES AND A PROCESS FOR PREPARING THE COMPOSITION

FIELD OF THE INVENTION

The invention relates to a process for preparing a composition comprising synthetic mineral particles, and to a composition comprising synthetic mineral particles.

BACKGROUND OF THE INVENTION

Throughout the text, "mineral particle" denotes any inorganic particle which contains carbon, where applicable, only in the form of carbonate or cyanide.

Throughout the text, "hydrothermal treatment" denotes any treatment carried out in a closed vessel, such as an autoclave, in the presence of water, at a predetermined temperature and at a pressure greater than atmospheric pressure.

Many minerals such as borates or silicates are used in various industrial fields. Phyllosilicate mineral particles, such as talc, are used, for example, in the form of fine particles in many industrial sectors, such as: thermoplastics, elastomers, paper, paints, varnishes, textiles, metallurgy, pharmaceuticals, cosmetics, phytosanitary products or fertilizers in which phyllosilicates such as talc are used, by being incorporated into a composition, as an inert filler (for their chemical stability or for the dilution of expensive active compounds) or as functional fillers (for example to enhance the mechanical properties of some materials).

Natural talc, which is a hydrated magnesium silicate of the formula $Si_4Mg_3O_{10}(OH)_2$, belongs to the phyllosilicate family. The phyllosilicates are composed of an irregular stack of elementary lamellae of crystalline structure, the number of which varies from several units to several tens of units. Among the phyllosilicates (lamellar silicates), the group comprising especially talc, mica and montmorillonite is characterized by the fact that each elementary lamella is constituted by the association of two tetrahedral layers situated on either side of an octahedral layer. This group corresponds to the 2:1 phyllosilicates, which include especially the smectites. In view of their structure, the 2:1 phyllosilicates are also described as being of the T-O-T (tetrahedron-octahedron-tetrahedron) type.

The octahedral layer of the 2:1 phyllosilicates is formed of two planes of $O^{2-}$ and $OH^-$ ions (in the molar proportion $O^{2-}:OH^-$ of 2:1). On either side of this middle layer there are two-dimensional lattices of tetrahedrons, of which one of the vertices is occupied by an oxygen of the octahedral layer, while the other three are occupied by substantially coplanar oxygens.

As regards talc, a high purity, fineness of the particles and good crystal properties are desirable for many of its applications, because they are determinative for the quality of the end product.

However, the preparation of a pulverulent composition from blocks of natural talc by grinding and treating the talc does not allow the purity, the lamellarity and the size of the particles of talc obtained to be controlled. Furthermore, grinding of natural talc irreversibly causes amorphization thereof, or at least a considerable reduction in its crystallinity.

Within this context, WO 2008/009799 proposes a process for preparing a talcose composition comprising at least one synthetic mineral containing silicon, germanium and metal of the formula $(Si_xGe_{1-x})_4M_3O_{10}(OH)_2$ by hydrothermal treatment of a hydrogel containing silicon and/or germanium, and metal of the formula $(Si_xGe_{1-x})_4M_3O_{11}$, n'$H_2O$, in the liquid state, at a temperature of from 300° C. to 600° C. Such a talcose composition according to WO 2008/009799 comprises particles containing silicon, germanium and metal of the formula $(Si_xGe_{1-x})_4M_3O_{10}(OH)_2$ which have structural similarities with natural talc and have, in X-ray diffraction, some diffraction lines characteristic of talc, that is to say lines corresponding to the planes (001), (020), (003) and (060).

Accordingly, although a process according to WO 2008/009799 permits the preparation of a synthetic mineral that is similar to talc and the purity of which can be controlled, it is hardly compatible with high industrial demands in terms of efficiency, profitability and structural qualities of the synthetic mineral particles obtained.

SUMMARY OF THE INVENTION

The invention aims to propose an improved process for preparing a composition comprising synthetic mineral particles.

The invention aims also to propose an improved process for preparing a composition comprising silicate synthetic mineral particles.

The invention aims to propose an improved process for preparing a composition comprising phyllosilicate synthetic mineral particles having at least one non-swelling phase.

The invention aims to propose a process for preparing a composition comprising synthetic mineral particles, in particular phyllosilicate synthetic mineral particles, having improved structural properties.

The invention aims to propose a process for preparing a composition comprising synthetic mineral particles, the duration of which process is reduced considerably relative to the duration of preparation necessary in a process for preparing such a composition described in the prior art.

The invention aims also to propose a process for preparing a talcose composition in which a hydrothermal treatment of a silico/germano-metallic hydrogel is carried out at a reduced temperature and/or for a reduced duration and which allows a talcose composition comprising phyllosilicate particles having improved properties to be obtained.

The invention aims to propose such a process which is simple and rapid to carry out and which is compatible with the constraints of industrial exploitation.

The invention aims to propose a process for preparing compositions comprising phyllosilicate synthetic mineral particles of high purity, comprising synthetic mineral particles having a lamellarity and a particle size that are fine and of low dispersion, and an improved and thermally stable crystal structure.

The invention aims also to propose compositions comprising synthetic mineral particles having improved properties, especially structural properties.

The invention aims also to propose compositions comprising phyllosilicate synthetic mineral particles which can be used as a replacement for natural talc compositions in various of their applications.

To that end, the invention relates to a process for preparing a composition comprising synthetic mineral particles, in which a hydrogel precursor of said synthetic mineral particles is prepared by a coprecipitation reaction between:
  at least one compound comprising silicon, and
  at least one compound comprising at least one metal element, wherein said coprecipitation reaction takes place in the presence of at least one carboxylate salt of the formula $R_2$—COOM' in which:

M' denotes a metal chosen from the group formed of Na and K, and $R_2$ is chosen from H and alkyl groups having fewer than 5 carbon atoms.

DETAILED DESCRIPTION OF THE INVENTION

The inventors have found, surprisingly, that a process according to the invention, in which a hydrogel precursor of synthetic mineral particles is prepared in the presence of at least one carboxylate salt of the formula $R_2$—COOM' as defined hereinbefore, allows synthetic mineral particles having improved properties to be obtained. No clear explanation can be given for the very surprising result obtained by the invention, which especially, by the simple addition of a carboxylate salt of the formula $R_2$—COOM' to the preparation medium of the hydrogel precursor, allows a composition comprising synthetic mineral particles having improved properties, especially in terms of crystallinity, to be obtained. In particular, a process according to the invention thus permits the preparation of a composition comprising synthetic mineral particles having structural properties that are very similar to a natural talc and especially that are more similar to a natural talc than a talcose composition of the prior art.

Advantageously and according to the invention there can be used as the compound comprising at least one metal element any metal compound suitable for reacting in said coprecipitation reaction of said hydrogel precursor of said synthetic mineral particles. Advantageously and according to the invention, said compound comprising at least one metal element is a dicarboxylate salt of the formula $M(R_1$—$COO)_2$ in which:

$R_1$ is chosen from H and alkyl groups having fewer than 5 carbon atoms, and

M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1.$$

Advantageously and according to the invention, said hydrogel is subjected to any treatment suitable for allowing said synthetic mineral particles to be obtained, for example a hydrothermal treatment.

Advantageously and according to the invention, said hydrogel is then subjected to a hydrothermal treatment at a temperature of from 150° C. to 400° C. to obtain said synthetic mineral particles.

In particular, the temperature at which the hydrothermal treatment of the hydrogel is carried out is from 150° C. to 370° C., especially from 200° C. to 350° C.

In addition, the duration of the hydrothermal treatment is adapted to allow said synthetic mineral particles to be obtained, especially as a function of the temperature at which the hydrothermal treatment is carried out. Advantageously and according to the invention, said hydrogel is subjected to a hydrothermal treatment for a duration of from 30 minutes to 30 days, in particular from 1 hour to 15 days and, for example, from 2 hours to 24 hours.

In particular, advantageously and according to the invention, the coprecipitation medium of said hydrogel precursor is subjected directly to a hydrothermal treatment. It is in fact possible to keep the coprecipitation medium of said hydrogel precursor, comprising said carboxylate salt of the formula $R_2$—COOM', in order to carry out the hydrothermal treatment, the presence of said carboxylate salt further allowing said hydrothermal treatment to be accelerated.

Accordingly, a process according to the invention allows a composition comprising synthetic mineral particles to be prepared in a simplified manner by preparing a hydrogel precursor of synthetic mineral particles in the presence of at least one carboxylate salt of the formula $R_2$-LOOM' and subsequently, that is to say without modifying the coprecipitation medium of said hydrogel, carrying out the conversion of said hydrogel precursor into a composition comprising synthetic mineral particles by a hydrothermal treatment.

The groups $R_1$ and $R_2$ can be identical or different. Advantageously and according to the invention, the groups $R_1$ and $R_2$ are chosen from the group formed of $CH_3$—, $CH_3$—$CH_2$— and $CH_3$—$CH_2$—$CH_2$—. In particular, advantageously and according to the invention, the groups $R_1$ and $R_2$ are identical.

Advantageously and according to the invention there is used as the compound comprising silicon any compound comprising at least one silicon atom suitable for reacting in said coprecipitation reaction of said hydrogel precursor of said synthetic mineral particles. In particular, advantageously and according to the invention, said compound comprising silicon is chosen from the group composed of sodium silicates and silicas (silicon dioxides). Advantageously and according to the invention, sodium metasilicate is used as the compound comprising silicon.

Advantageously and according to the invention, said hydrogel precursor of said synthetic mineral particles is a silico/germano-metallic hydrogel (i.e. containing silicon and/or germanium and metal) of the formula $(Si_xGe_{1-x})_4M_3O_{11}$, $n'H_2O$:

x being a real number of the interval [0; 1], n' referring to a number of molecule(s) of water associated with said hydrogel.

In a particularly advantageous embodiment of a process according to the invention, said silico/germano-metallic hydrogel has the formula $Si_4M_3O_{11}$, $n'H_2O$. In this case, said silico/germano-metallic hydrogel of the formula $Si_4M_3O_{11}$, $n'H_2O$ is a silico-metallic hydrogel.

Advantageously and according to the invention, said synthetic mineral particles are silicate mineral particles, that is to say particles belonging to the family of the silicates, the structure of which includes $[SiO_4]$ tetrahedral groups. In particular, advantageously and according to the invention, said synthetic mineral particles are phyllosilicate mineral particles, that is to say particles belonging to the family of the lamellar silicates, which includes, for example, micas and talc.

Advantageously and according to the invention, said phyllosilicate mineral particles have at least one non-swelling phase formed of a stack of elementary lamellae of the 2:1 phyllosilicate type and having the chemical formula $(Si_xGe_{1-x})_4M_3O_{10}(OH)_2$. In particular, in a particularly advantageous embodiment of a process according to the invention, said non-swelling phase can be formed of a stack of elementary lamellae of the 2:1 phyllosilicate type and having the chemical formula $Si_4M_3O_{10}(OH)_2$, and more particularly having the chemical formula $Si_4Mg_3O_{10}(OH)_2$ (M then denoting magnesium).

In particular, after a hydrothermal treatment of a silico-germano-metallic hydrogel precursor of the formula $(Si_xGe_{1-x})_4M_3O_{11}$, n'$H_2O$, prepared by a process according to the invention, there is obtained a composition comprising phyllosilicate synthetic mineral particles having, in X-ray diffraction, at least one diffraction line characteristic of a plane (001) situated at a distance between 9.40 Å and 9.90 Å. The presence of such a diffraction line is characteristic of a product that is very similar to a natural talc. Furthermore, such a composition does not have, in X-ray diffraction, a diffraction line characteristic of a plane situated at a distance between 12.00 Å and 18.00 Å, conventionally indicating the residual presence of a swelling phase having interfoliar spaces in which interfoliar cations and possibly molecules of water are found. Such a swelling phase is different from a talcose product of the formula $(Si_xGe_{1-x})_4M_3O_{10}(OH)_2$.

Furthermore, a composition comprising phyllosilicate synthetic mineral particles that is obtained by a process according to the invention has, in X-ray diffraction, at least one diffraction line characteristic of a plane (002) situated at a distance between 4.60 Å and 4.80 Å.

Advantageously and according to the invention, the carboxylate salt(s) of the formula $R_2$—COOM' is(are) present so as to give, based on silicon, a molar ratio $R_2$—COOM'/Si of from 0.1 to 9.

Advantageously and according to the invention, the concentration of carboxylate salt(s) in the preparation medium of the hydrogel precursor can be adapted to allow a composition comprising synthetic mineral particles to be obtained after a reduced duration of hydrothermal treatment. Advantageously and according to the invention, the carboxylate salt(s) of the formula $R_2$—COOM' is(are) present so as to give a concentration of carboxylate salt(s) of the formula $R_2$—COOM' of from 0.2 mol/l to 5 mol/l.

Advantageously and according to the invention, the hydrothermal treatment of said hydrogel, and in particular of said silico/germano-metallic gel, is carried out by means of an autoclave. It can be, for example, an autoclave formed of a nickel-based alloy such as Hastelloy® (marketed by Haynes International, Kokomo, United States) or an autoclave made of titanium or optionally made of steel with an inner polytetrafluoroethylene (PTFE) lining in a case where the hydrothermal treatment temperature does not exceed 250° C. Such an autoclave can have any capacity, for example a capacity ranging from 200 ml to 50 liters.

Advantageously and according to the invention, said hydrothermal treatment is carried out with mechanical stirring. To that end there can be used, for example, an autoclave equipped with an internal metal screw.

Advantageously and according to the invention, said hydrothermal treatment is carried out at a pressure of from 0.5 MPa (5 bar) to 20 MPa (200 bar). Advantageously and according to the invention, said hydrothermal treatment is carried out under autogenous pressure, that is to say at a pressure that is at least equal to the saturation vapor pressure of water (pressure at which the vapor phase is in equilibrium with the liquid phase). The autogenous pressure reached in the autoclave during the hydrothermal treatment therefore depends especially on the temperature at which said hydrothermal treatment is carried out, on the volume of the autoclave and on the quantity of water present. It is likewise possible to carry out the hydrothermal treatment at a pressure greater than the saturation vapor pressure of water or greater than the autogenous pressure in the vessel in which the hydrothermal treatment is taking place. To that end, a gas that is chemically neutral with respect to the hydrothermal reaction is injected into the autoclave or the vessel in which the hydrothermal treatment is taking place. Such a gas is chosen from the group formed of the inert gases (rare gases), in particular argon, nitrogen ($N_2$), carbon dioxide and air (compressed air).

Advantageously and according to the invention there is added to the autoclave, with said hydrogel, and in particular with said silico/germano-metallic hydrogel, a quantity of water (preferably distilled water) that is at least sufficient to create a saturation vapor pressure inside the autoclave brought to the treatment temperature.

Advantageously and according to the invention, the hydrothermal treatment is carried out with a hydrogel, in particular a silico/germano-metallic hydrogel, that is liquefied and has a liquid/solid ratio of from 2 to 20, especially from 5 to 15 (the quantity of liquid being expressed in $cm^3$ and the quantity of solid in grams, and denoting the quantity of dry hydrogel only, that is to say without taking into account the carboxylate salt(s)). Optionally, if necessary, an appropriate quantity of water for achieving that ratio is added to said liquefied silico/germano-metallic hydrogel.

Advantageously and according to the invention, at the end of a hydrothermal treatment of a silico/germano-metallic hydrogel according to the invention there is obtained a composition in the form of a colloidal solution containing phyllo silicate mineral particles having at least one non-swelling phase. These synthetic mineral particles in solution are in a state such that the particles are well individualized relative to one another, with very few or no aggregate(s) of synthetic mineral particles.

Advantageously and according to the invention, at the end of the hydrothermal treatment there is recovered a colloidal composition comprising synthetic mineral particles in suspension in an aqueous solution of carboxylate salt(s). Said colloidal composition can then be subjected to a drying step, after an optional step of washing with water in order to remove at least partially said carboxylate salt(s). Such a washing step comprises at least one cycle of washing/centrifugation of said colloidal composition.

Said composition comprising synthetic mineral particles that is obtained by a process according to the invention can be dried by any powder drying technique. Advantageously and according to the invention, following said hydrothermal treatment, said synthetic mineral particles obtained are dried by lyophilization. Drying can also be carried out by means of an oven, for example at a temperature of from 60° C. to 130° C., for from 1 hour to 48 hours, under microwave irradiation or by atomization.

It is further possible to subject the composition comprising synthetic mineral particles that is obtained after hydrothermal treatment to an anhydrous heat treatment, in air, at a temperature greater than 350° C. and lower than the degradation temperature of the synthetic mineral particles. Advantageously and according to the invention, a composition comprising synthetic mineral particles that is obtained after hydrothermal treatment is subjected to an anhydrous heat treatment at a temperature of from 350° C. to 850° C., in particular from 400° C. to 750° C. and in particular from 450° C. to 600° C., for example for a duration of from 30 minutes to 24 hours. Advantageously and according to the invention, after said hydrothermal treatment, said composition comprising synthetic mineral particles is subjected to an anhydrous heat treatment. Such a heat treatment or "annealing" permits an additional increase in the crystallinity of the particles obtained.

The invention relates also to a composition comprising synthetic mineral particles, which composition has, in X-ray diffraction, the following characteristic diffraction lines:
- a plane (001) situated at a distance between 9.40 Å and 9.90 Å;
- a plane (002) situated at a distance between 4.60 Å and 4.80 Å;
- a plane (003) situated at a distance between 3.10 Å and 3.20 Å;
- a plane (060) situated at a distance between 1.51 Å and 1.53 Å;

the intensity of the diffraction line characteristic of a plane (002) being greater than the intensity of the signal corresponding to a plane (020) situated at a distance between 4.40 Å and 4.60 Å, and the ratio between the intensity of the diffraction line characteristic of a plane (001) and the intensity of the diffraction line characteristic of a plane (003) being from 0.60 to 1.50.

Such a composition is prepared by a process according to the invention. Indeed, in particular in the case of a hydrothermal treatment which is of long duration and/or is carried out at a sufficiently high temperature, and/or following an anhydrous heat treatment, it is possible that such a composition has, in X-ray diffraction, a diffraction line characteristic of a plane (002) situated at a distance between 4.60 Å and 4.80 Å that is of an intensity so much greater than that of the diffraction line representative of a plane (020) situated at a distance between 4.40 Å and 4.60 Å that the diffraction line representative of the plane (020) can be masked by the diffraction line characteristic of the plane (002).

Advantageously and according to the invention, said synthetic mineral particles are phyllosilicate mineral particles having at least one non-swelling phase formed of a stack of elementary laminae of the 2:1 phyllosilicate type and having the chemical formula $(Si_xGe_{1-x})_4M_3O_{10}(OH)_2$, in which:

x is a real number of the interval [0; 1], and

M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1.$$

In particular, said composition does not have, in X-ray diffraction, a diffraction line characteristic of a plane situated at a distance between 12.00 Å and 18.00 Å, which conventionally reveals the more or less considerable residual presence of a swelling phase.

In addition, a near-infrared spectrum of a composition according to the invention has lines characteristic of the vibration bands of a natural talc. Advantageously and according to the invention, a composition according to the invention has, in near-infrared, a vibration band at 7185 cm$^{-1}$ representative of the vibration of the Mg$_3$—OH bond of talc.

Furthermore, the near-infrared spectrum of a composition comprising synthetic mineral particles according to the invention has a vibration band, situated between 5000 cm$^{-1}$ and 5500 cm$^{-1}$, characteristic of a synthetic talc composition according to the invention and revealing the presence of molecules of water bonded to the talc at lamina edges. Accordingly, advantageously and according to the invention, a synthetic talc composition according to the invention has, in near-infrared, a vibration band situated between 5000 cm$^{-1}$ and 5500 cm$^{-1}$, in particular between 5200 cm$^{-1}$ and 5280 cm$^{-1}$, corresponding to the presence of water bonded at lamina edges. The presence of such a vibration band, having high intensity, is capable of allowing a synthetic talc according to the invention to be distinguished from a natural talc, the other infrared vibration bands of a synthetic talc according to the invention and of a natural talc being similar.

The invention relates also to a process for preparing a composition comprising synthetic mineral particles and to a composition comprising synthetic mineral particles, characterized in combination by all or some of the features mentioned hereinabove or hereinbelow.

Other objects, advantages and features of the invention will become apparent from reading the description and the examples which follow and which refer to the accompanying figures showing a diffractogram corresponding to the X-ray diffraction analysis carried out on a composition obtained by a process according to the invention.

BRIEF DESCRIPTION OF THE DRAWINGS

FIG. 2 shows an enlargement of part of the diffractograms shown in FIG. 1.

Figure 1:
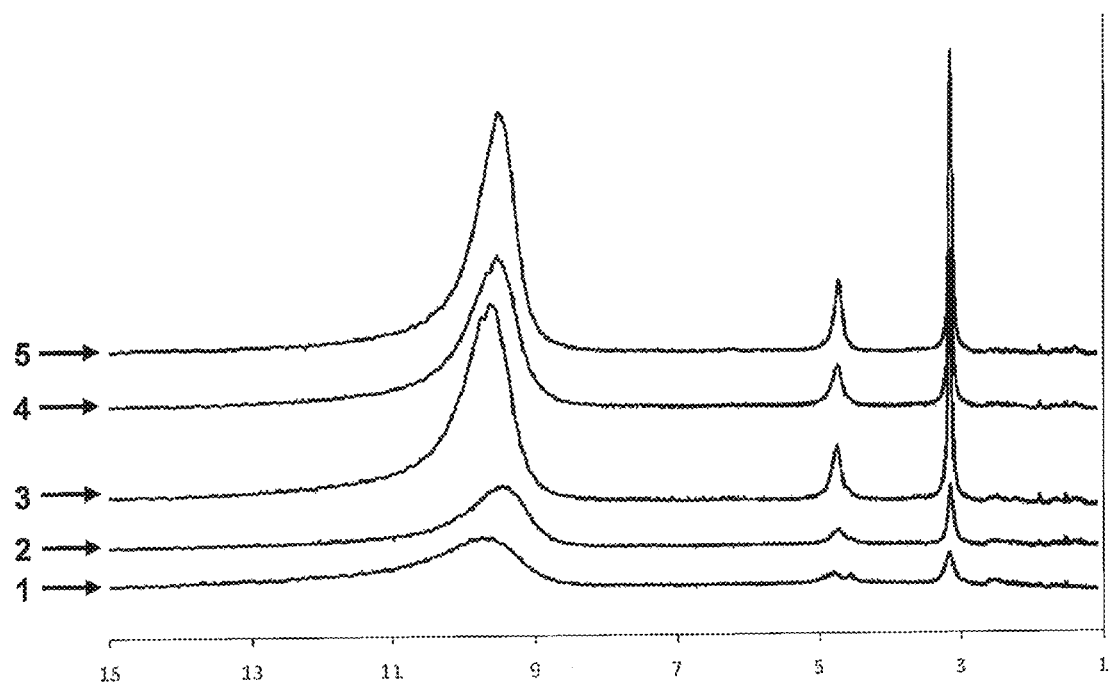
FIGS. 1 to 3 show RX diffractograms with the relative intensity of the signal (number of counts per second) as a function of the inter-reticular distance in Angstroms. Curves 1 to 5 of FIGS. 1 and 2 and curves 3 and 10 of FIG. 3 show the results of analyses carried out by X-ray diffraction of a synthetic talc composition $Si_4Mg_3O_{10}(OH)_2$ prepared by a process according to the invention.

A—GENERAL PROTOCOL FOR THE PREPARATION OF A COMPOSITION COMPRISING SYNTHETIC MINERAL PARTICLES ACCORDING TO THE INVENTION

1—Preparation of a Silico/Germano-Metallic Hydrogel

The silico/germano-metallic hydrogel can be prepared by a coprecipitation reaction involving, as reagent, at least one compound comprising silicon, at least one dicarboxylate salt of the formula $M(R_1—COO)_2$ in the presence of at least one carboxylate salt of the formula $R_2—COOM'$ wherein M' denotes a metal chosen from the group formed of Na and K, and R$_2$ is chosen from H and alkyl groups having fewer than 5 carbon atoms.

By means of this coprecipitation reaction it is possible to obtain a hydrated silico/germano-metallic hydrogel having the stoichiometry of talc (4 Si for 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1).$$

The silico/germano-metallic hydrogel is prepared by a coprecipitation reaction carried out starting from:

1. an aqueous solution of penta-hydrated sodium metasilicate or an aqueous solution of sodium metagermanate, or a mixture of these two solutions in the molar proportions x:(1-x),
2. a solution of dicarboxylate salt(s) prepared with one or more dicarboxylate salt(s) of the formula $M(R_1-COO)_2$ diluted in a carboxylic acid, such as acetic acid, and
3. a solution of carboxylate salt(s) prepared with one or more carboxylate salt(s) of the formula $R_2-COOM'$ diluted in distilled water.

The preparation of the silico/germano-metallic hydrogel is carried out following the protocol below:
1. the solutions of sodium metasilicate and carboxylate salt(s) of the formula $R_2-COOM'$ are mixed,
2. the solution of dicarboxylate salt(s) of the formula $M(R_1-COO)_2$ is added rapidly thereto; the coprecipitation hydrogel forms instantaneously.

It is further possible to subject the preparation medium of said hydrogel to ultrasound.

At the end of this precipitation there is obtained a silico/germano-metallic hydrogel $(Si_xGe_{1-x})_4M_3O_{11}$, n'$H_2O$ in an aqueous solution of carboxylate salt(s), said hydrogel being strongly hydrated and having a more or less gelatinous consistency.

The silico/germano-metallic hydrogel $(Si_xGe_{1-x})_4M_3O_{11}$, n'$H_2O$ obtained in the presence of the carboxylate salt(s) of the formulae $R_2-COOM'$ and $R_1-COOM'$ is thus ready to be subjected directly to a hydrothermal treatment.

The hydrogel can likewise be recovered after centrifugation (for example 3000 to 15,000 revolutions per minute, for 5 to 60 minutes) and removal of the supernatant (solution of carboxylate salt(s)), optionally washing with demineralized water (for example two successive washings and centrifugations) and then drying, for example in an oven (60° C., 2 days), by lyophilization, by drying by atomization or by drying under microwave irradiation. The particles containing silicon, germanium and metal of the formula $(Si_xGe_{1-x})_4M_3O_{11}$, n'$H_2O$ can accordingly be stored in the form of a powder (in the presence or absence of the carboxylate salts(s), depending on whether washing with water has been carried out or not) with a view to possible subsequent hydrothermal treatment.

2—Hydrothermal Treatment of Said Silico/Germano-Metallic Hydrogel

The silico/germano-metallic hydrogel $(Si_xGe_{1-x})_4M_3O_{11}$, n'$H_2O$ as obtained hereinbefore, which may or may not have been dried, is subjected to a hydrothermal treatment at a temperature of especially from 150° C. to 370° C.

To that end:
1. the hydrogel as obtained after precipitation (where appropriate in suspension with the carboxylate salt(s) of the formulae $R_2-COOM'$ and $R_1-COOM'$) or previously dried, is placed in a reactor/autoclave,
2. if necessary, an aqueous solution comprising at least one carboxylate salt of the formula $R_2-COOM'$ (in hydrated or anhydrous form) is added to said hydrogel, with stirring,
3. the liquid/solid ratio is optionally adjusted to a value of from 2 to 20, especially from 5 to 15 (the quantity of liquid being expressed in cm³ and the quantity of solid in grams, and denoting the quantity of dry hydrogel only, that is to say without taking into account the carboxylate salts(s)),
4. the reactor/autoclave is placed inside a furnace or an oven, at a predetermined reaction temperature (established from 150° C. to 350° C.) throughout the treatment.

During the hydrothermal treatment, the silico/germano-metallic hydrogel gradually acquires a gelatinous consistency. The composition comprising mineral particles that is obtained at the end of the hydrothermal treatment has a crystallinity which can be observed in X-ray diffraction, that crystallinity increasing with the duration of the hydrothermal treatment and manifesting itself on the corresponding diffractograms by the rapid appearance of characteristic lines, which become finer and intensify rapidly during the treatment.

Furthermore, it has been observed by near-infrared analysis that the intensity of the vibration band corresponding to the vibration of the $Mg_3-OH$ bond also increases with the duration of the hydrothermal treatment.

At the end of this hydrothermal treatment there is obtained a colloidal talcose composition comprising phyllosilicate mineral particles in suspension in an aqueous solution of carboxylate salt(s). At the end of this hydrothermal treatment, the talcose composition contained in the reactor is recovered by centrifugation (3000 to 15,000 revolutions per minute for 5 to 60 minutes) and then removal of the supernatant. The supernatant solution contains said salt(s) of the formula $R-COOM'$ and can be stored with a view to recovering the carboxylate salt(s) and recycling it/them.

The composition comprising mineral particles that is recovered is then, preferably, washed with water, in particular with distilled or osmozed water, at least two cycles of washing/centrifugation being carried out.

The composition comprising mineral particles that is recovered after the last centrifugation can then be dried:
  in an oven at a temperature of from 60° C. to 130° C. for from 1 to 24 hours, or
  by lyophilization, for example in a lyophilizer of the CHRIST ALPHA® 1-2 LD Plus type, for from 48 hours to 72 hours,
  or by atomization.

There is ultimately obtained a divided solid composition, the color of which is dependent on the nature of the dicarboxylate salt(s) of the formula $M(R_1-COO)_2$ used for the preparation of the silico/germano-metallic hydrogel (and also, where applicable, on the respective proportions of those dicarboxylate salt(s)).

The inventors have accordingly found not only that a relatively short duration of the hydrothermal treatment is sufficient to allow the initial hydrogel to be converted into a crystallized and thermally stable material, but also that the synthetic mineral particles obtained have improved crystallinity.

The phyllosilicate mineral particles contained in a talcose composition obtained by a process according to the invention have remarkable properties in terms of purity, crystallinity and thermal stability, and those properties are obtained with a duration of the hydrothermal treatment that is reduced significantly as compared with the duration of the hydrothermal treatment previously necessary in a known process for preparing a talcose composition.

Furthermore, following the hydrothermal treatment, a composition, in particular a talcose composition, obtained by a process according to the invention can optionally be subjected to an anhydrous heat treatment, which is carried out at a pressure below 5 bar (0.5 MPa), at a temperature greater than 350° C. and lower than the degradation temperature of the synthetic mineral particles, especially at a temperature of from 450° C. to 600° C., for example for a duration of from 30 minutes to 24 hours, in particular from 1 to 15 hours.

B—STRUCTURAL ANALYSIS AND CHARACTERIZATION

The analysis results of a talcose composition obtained following the protocol described hereinbefore are reported below. These results confirm that it is possible by means of the invention to effectively form synthetic phyllosilicate mineral particles having structural characteristics (especially lamellarity and crystallinity) that are very similar to those of natural talcs. They also show that, especially by the choice of temperature and duration of implementation, the invention permits the extremely simple synthesis of synthetic mineral particles containing silicon and/or germanium and metal that are stable and pure and have a size and crystalline characteristics that are defined and foreseeable.

The analyses were carried out especially by X-ray diffraction, by infrared and by observations under an electron microscope. The collected data are presented in the accompanying figure and in the examples, and are commented on hereinbelow.

1—X-Ray Diffraction Analyses

In X-ray diffraction (RX), a natural talc such as a talc from the ARNOLD mine (New York state, USA) is known to have the following characteristic diffraction lines (according to the publication of Ross M., Smith W. L. and Ashton W. H., 1968, "Triclinic talc and associated amphiboles from Gouverneur mining district, New York; American Mineralogist", volume 53, pages 751-769):

- for the plane (001), a line situated at a distance of 9.34 Å;
- for the plane (002), a line situated at a distance of 4.68 Å;
- for the plane (020), a line situated at a distance of 4.56 Å;
- for the plane (003), a line situated at a distance of 3.115 Å;
- for the plane (060), a line situated at a distance of 1.52 Å.

Figure 2:
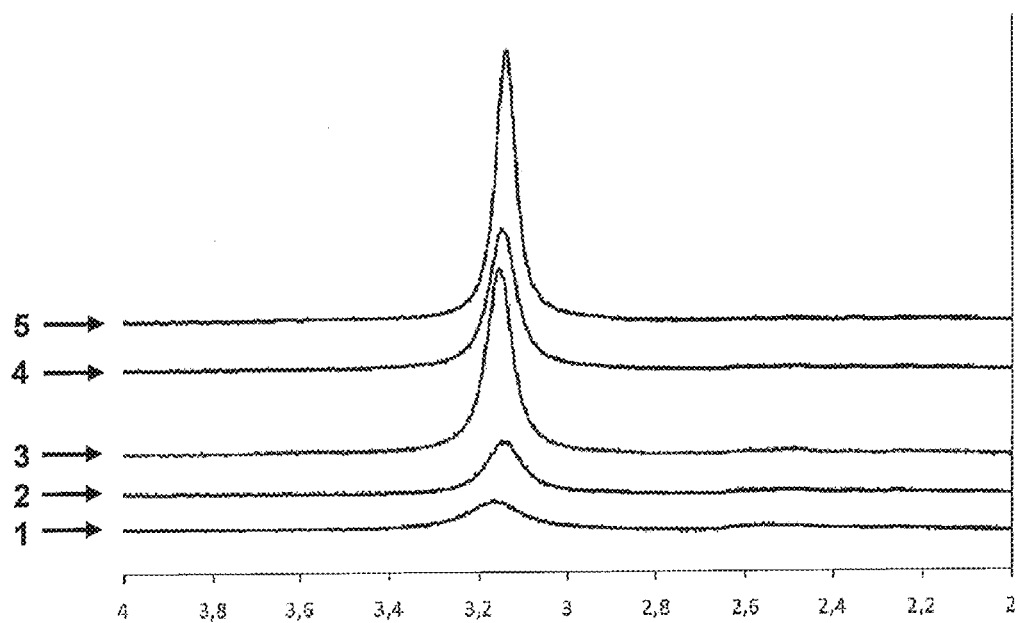
Figure 3:
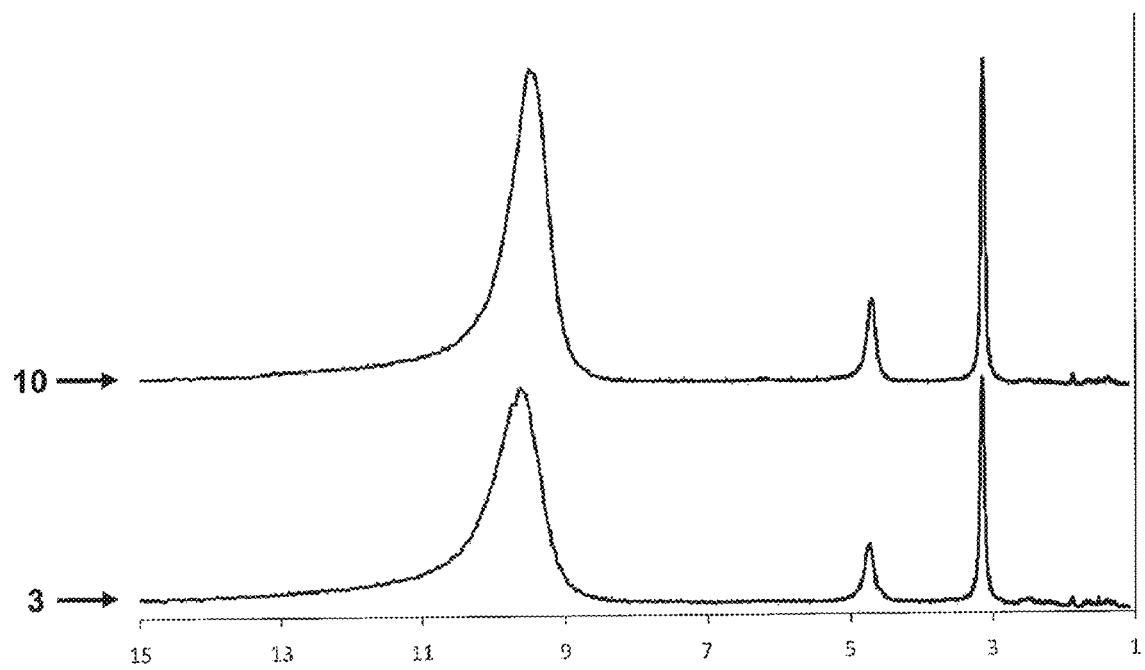

FIGS. 1 to 3 show RX diffractograms, on each of which there is shown the relative intensity of the signal (number of counts per second) as a function of the inter-reticular distance in Angstroms.

FIGS. 1 and 2 show the results of analyses carried out by X-ray diffraction on:

- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 3 hours (curve 1),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 6 hours (curve 2),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 18 hours (curve 3),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 24 hours (curve 4),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 10 days (curve 5).

FIG. 2 shows an enlargement of part of the diffractograms shown in FIG. 1, that is to say only the part of the diffractograms corresponding to the inter-reticular distances between 2 Å and 4 Å, thus permitting better visualization of the lines corresponding to the plane (003).

FIG. 3 shows the results of X-ray diffraction analyses on a synthetic talc composition of the formula $Si_4Mg_3O_{10}(OH)_2$ prepared by a process according to the invention with precipitation of a silico-metallic hydrogel in the presence of sodium acetate and hydrothermal treatment at 300° C. for 18 hours (curve 3), and on that same synthetic talc composition after anhydrous heat treatment for 5 hours at 550° C. (curve 10).

The RX diffractograms shown in FIGS. 1 to 3 were recorded on a CPS 120 device marketed by INEL (Artenay, France). This is a diffractometer with a curved detector, allowing detection in real time over an angle domain of 120°. The acceleration voltage used is 40 kV and the intensity 25 mA. The Bragg equation giving the structural equidistance is: $d_{hkl}=0.89449/\sin\theta$ (with the use of a cobalt anticathode).

This X-ray diffraction analysis confirms that there is great structural similarity between the phyllosilicate mineral particles of the talcose compositions prepared according to the invention and the particles of natural talc.

In particular, the diffraction lines which respectively correspond to the planes (003) and (060) have positions which coincide perfectly with those of the reference diffraction lines for natural talc.

Furthermore, analysis of the RX diffractograms of the prepared talcose compositions also allows the "coherent domain" to be determined for each talcose composition, that is to say the number of elementary laminae that are stacked without a major defect in the c* direction (of the reciprocal space of the crystal lattice of the synthetic mineral particles). The coherent domain can be determined for the lines (001) and depends especially on the full width at half maximum of the corresponding line and on the corresponding diffraction angle. In the case of the synthetic talc, it is determined in particular starting from the line (003).

A natural talc from the LYAONING province (China) has, for example, a coherent domain of 70 laminae.

The talcose compositions prepared by a process according to the invention have coherent domains which are similar to the coherent domains of natural talcs and greater than the coherent domains of synthetic talcs of the prior art for comparable temperatures and durations of hydrothermal treatment.

Analysis of the RX diffractograms of the prepared talcose compositions also allows the ratio between the intensity of the diffraction line characteristic of plane (001) and the intensity of the diffraction line characteristic of plane (003) to be determined and compared with that of a natural talc. For a natural talc from the LYAONING province (China), the ratio between the intensity of the diffraction line characteristic of plane (001) and the intensity of the diffraction line characteristic of plane (003) is 0.61.

2—Near-Infrared Analyses

In infrared, it is known that natural talc has, in near-infrared, a vibration band at 7185 cm$^{-1}$ representative of the vibration of the $Mg_3$—OH bond.

Figure 4:
FIGS. 4 and 5 show near-infrared spectra with the intensity of the signal as a function of the wavelength expressed in cm$^{-1}$. Curves 11 to 15 of FIG. 5 and curves 13 and 20 of FIG. 4 show the near-infrared spectra of a synthetic talc composition $Si_4Mg_3O_{10}(OH)_2$ prepared by a process according to the invention. Curve 16 of FIG. 5 show the near-infrared spectra of a natural talc composition.
Figure 5:
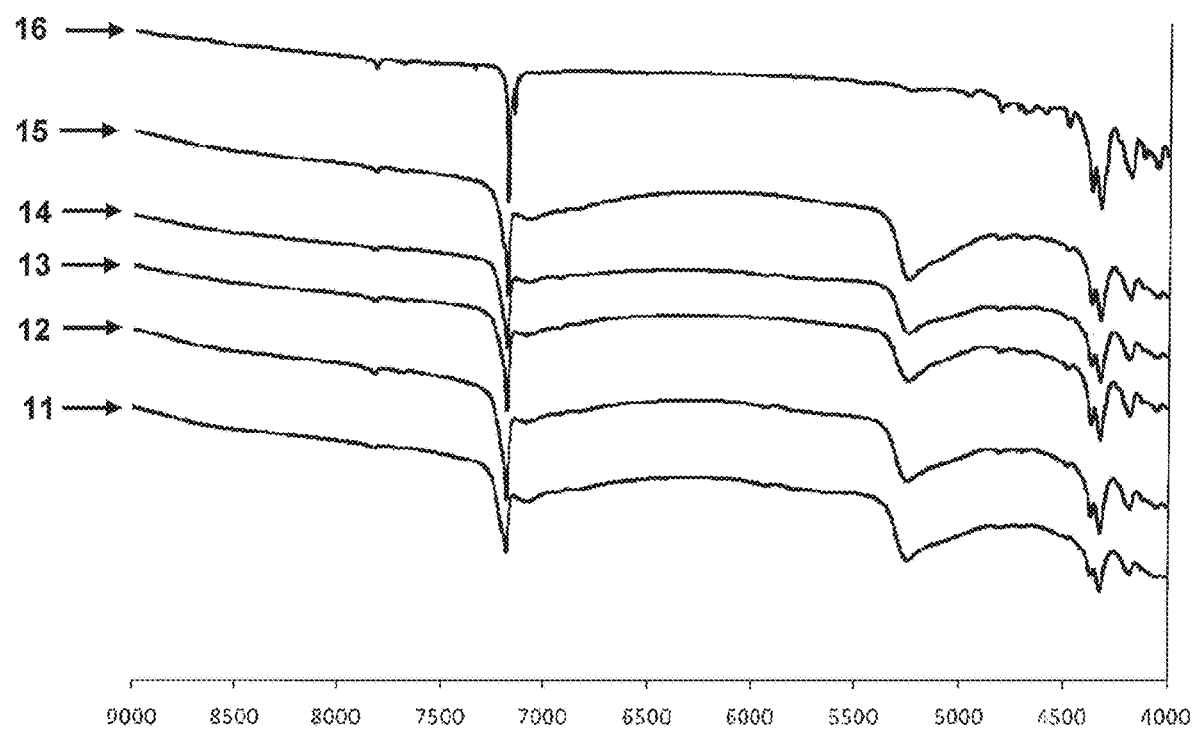

FIGS. 4 and 5 show near-infrared spectra, on each of which there is shown the intensity of the signal as a function of the wavelength expressed in $cm^{-1}$. FIG. 5 shows the near-infrared spectra of:

- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 3 hours (curve 11),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 6 hours (curve 12),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 18 hours (curve 13),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 24 hours (curve 14),
- a synthetic talc composition $Si_4Mg_3O_{10}(OH)_2$ prepared by a process according to the invention with precipitation of a silico-metallic hydrogel in the presence of sodium acetate and hydrothermal treatment of said hydrogel at a temperature of 300° C. for 10 days (curve 15),
- and a natural talc composition from the LYAONING province (China) (curve 16).

FIG. 4 shows a near-infrared spectrum of a synthetic talc composition $Si_4Mg_3O_{10}(OH)_2$ prepared by a process according to the invention with precipitation of a silico-metallic hydrogel (i.e. containing silicon and metal) in the presence of sodium acetate and hydrothermal treatment of said hydrogel at a temperature of 300° C. for 18 hours (curve 13) as well as a near-infrared spectrum of that same synthetic talc composition after anhydrous heat treatment for 5 hours at 550° C. (curve 20).

These spectra were acquired using a NICOLET 6700-FTIR spectrometer over a domain of 9000 $cm^{-1}$ to 4000 $cm^{-1}$.

3—Microscopic Observations and Assessment of the Particle Size of the Particles

In view of the considerable fineness of the powders of which the talcose compositions according to the invention can be constituted, the size and particle size distribution of the phyllosilicate mineral particles composing them were assessed by observation under a field-emission scanning electron microscope and under a transmission electron microscope.

It is found that the particle size of the elementary particles varies between 20 nm and 100 nm.

It has further been observed that the synthetic talc particles prepared by a process according to the invention exhibit a pearly effect which may be of interest in many industrial fields.

The examples which follow illustrate the preparation process according to the invention and the structural characteristics of the compositions comprising synthetic mineral particles, and in particular of the talcose compositions comprising phyllosilicate mineral particles, so obtained.

Example 1—Preparation of a Composition Comprising Synthetic Mineral Particles According to the Invention A first aqueous solution of sodium metasilicate comprising 42.43 g of pentahydrated sodium metasilicate $Na_2SiO_3, 5H_2O$ and 140 ml of demineralized water is prepared, and the solution is stirred at ambient temperature (21° C.) for 10 minutes. 171 g of trihydrated sodium acetate $CH_3$—$COONa.3H_2O$ are then added to the solution, stirring of the solution being maintained for 10 minutes and the solution being maintained at a temperature of from 30° C. to 50° C. with the aid of a water bath. The concentration of sodium acetate in this first solution is 4 mol/1.

A second solution of magnesium acetate comprising 32.17 g of tetrahydrated magnesium acetate $Mg(CH_3$—$COO)_2.4H_2O$ and 100 ml of 1M concentrated acetic acid is then prepared.

Finally, when the first solution of sodium metasilicate and sodium acetate has returned to ambient temperature, the second solution is added rapidly to the first solution, with stirring and in a single batch.

There is obtained a suspension of hydrogel precursor of synthetic talc particles, which is in the form of a hydrogel of milky consistency. At the end of the precipitation of the hydrogel, the concentration of sodium acetate in the hydrogel suspension is 4 mol/1, as during the subsequent hydrothermal treatment, the hydrogel obtained then being subjected directly to a hydrothermal treatment.

The hydrothermal treatment of the hydrogel is carried out at a temperature of 300° C. for 3 hours at a pressure of 80 bar (8 MPa) (saturation vapor pressure of the water in the reactor).

To that end, the hydrogel suspension so obtained is placed directly in a closed titanium reactor. The titanium reactor is then placed in a furnace at a temperature of 300° C. for 3 hours.

After cooling to ambient temperature, the reactor is opened and the suspension obtained is centrifuged. After centrifugation there are recovered on the one hand a talcose composition and on the other hand a supernatant solution comprising especially sodium acetate, which can then be recovered and optionally recycled.

The talcose composition that has been recovered is then subjected to two successive cycles of washing with demineralized water and centrifugation.

The talcose composition recovered after centrifugation is finally dried by lyophilization for 72 hours.

The X-ray diffractogram of the synthetic talc composition of formula $Si_4Mg_3O_{10}(OH)_2$ so obtained is shown in FIG. 1 (curve 1). The X-ray diffractogram of this talcose composition has diffraction lines corresponding to the diffraction lines of talc, and in particular the following characteristic diffraction lines:

- a plane (001) situated at a distance of 9.77 Å (I=100);
- a plane (002) situated at a distance of 4.78 Å (I=33);
- a plane (020) situated at a distance of 4.55 Å (I=26);
- a plane (003) situated at a distance of 3.17 Å (I=61);
- a plane (060) situated at a distance of 1.52 Å (I=11).

Such a talcose composition has a coherent domain of 12 laminae (using line (003)). The ratio between the intensity of the diffraction line characteristic of plane (001) and the intensity of the diffraction line characteristic of plane (003) is 1.49.

The near-infrared spectrum of the synthetic talc composition obtained is shown in FIG. 5 (curve 11). It has a vibration band at 7185 cm$^{-1}$ representing the vibration of the Mg$_3$—OH bond of the talc. The near-infrared spectrum also has a vibration band at 5251 cm$^{-1}$ which is characteristic of a synthetic talc according to the invention and corresponds to the presence of water bonded to the talc at lamina edges.

Example 2—Preparation of a Composition Comprising Synthetic Mineral Particles According to the Invention A hydrogel precursor of synthetic mineral particles is prepared according to the protocol described in Example 1.

The hydrogel obtained is subjected directly to a hydrothermal treatment at a temperature of 300° C. for 6 hours at a pressure of 80 bar (8 MPa) (saturation vapor pressure of the water in the reactor). The concentration of sodium acetate during the hydrothermal treatment is 4 mol/1.

The talcose composition that is recovered is then subjected to two successive cycles of washing with demineralized water and centrifugation and is finally dried by lyophilization for 72 hours.

The X-ray diffractogram of the synthetic talc composition of formula Si$_4$Mg$_3$O$_{10}$(OH)$_2$ so obtained is shown in FIG. 1 (curve 2).

The X-ray diffractogram of this talcose composition has diffraction lines corresponding to the diffraction lines of talc, and in particular the following characteristic diffraction lines:
 a plane (001) situated at a distance of 9.45 Å (I=100);
 a plane (002) situated at a distance of 4.72 Å (I=34);
 a plane (020) situated at a distance of 4.57 Å (I=20);
 a plane (003) situated at a distance of 3.14 Å (I=98);
 a plane (060) situated at a distance of 1.53 Å (I=18).

Such a talcose composition has a coherent domain of 19 laminae (using line (003)). The ratio between the intensity of the diffraction line characteristic of plane (001) and the intensity of the diffraction line characteristic of plane (003) is 1.06.

The near-infrared spectrum of the synthetic talc composition obtained is shown in FIG. 5 (curve 12). It has a vibration band at 7185 cm$^{-1}$ representative of the vibration of the Mg$_3$—OH bond of the talc. The near-infrared spectrum also has a vibration band at 5251 cm$^{-1}$ which is characteristic of a synthetic talc according to the invention and corresponds to the presence of water bonded to the talc at lamina edges.

Example 3—Preparation of a Composition Comprising Synthetic Mineral Particles According to the Invention A hydrogel precursor of synthetic mineral particles is prepared according to the protocol described in Example 1.

The hydrogel obtained is subjected directly to a hydrothermal treatment at a temperature of 300° C. for 18 hours at a pressure of 80 bar (8 MPa) (saturation vapor pressure of the water in the reactor). The concentration of sodium acetate during the hydrothermal treatment is 4 mol/1.

The talcose composition that is recovered is then subjected to two successive cycles of washing with demineralized water and centrifugation and is finally dried by lyophilization for 72 hours.

The X-ray diffractogram of the synthetic talc composition of formula Si$_4$Mg$_3$O$_{10}$(OH)$_2$ so obtained is shown in FIG. 1 (curve 3).

The X-ray diffractogram of this talcose composition has diffraction lines corresponding to the diffraction lines of talc, and in particular the following characteristic diffraction lines:
 a plane (001) situated at a distance of 9.64 Å (I=100);
 a plane (002) situated at a distance of 4.74 Å (I=30);
 a plane (020) situated at a distance of 4.59 Å (slight shoulder);
 a plane (003) situated at a distance of 3.15 Å (I=100);
 a plane (060) situated at a distance of 1.52 Å (I=5).

The intensity I of the corresponding lines that is given is normalized relative to the most intense line of the diffractogram, the intensity of the most intense line being taken as 100. It is observed that such a composition prepared by a process according to the invention has, in X-ray diffraction, lines corresponding to the planes (001) and (003) of very high intensities relative to the other lines, indicating crystallinity very similar to that of a natural talc. Furthermore, the line corresponding to the plane (002) has a higher intensity than the line corresponding to the plane (020), the diffraction line characteristic of a plane (020) being in part coincident with the diffraction line characteristic of a plane (002) and being present only in the form of a slight shoulder.

Such a talcose composition has a coherent domain of 25 laminae (using line (003)). The ratio between the intensity of the diffraction line characteristic of plane (001) and the intensity of the diffraction line characteristic of plane (003) is 0.96. The near-infrared spectrum of the synthetic talc composition obtained is shown in FIGS. 4 and 5 (curve 13). It has a vibration band at 7185 cm$^{-1}$ representative of the vibration of the Mg$_3$—OH bond of the talc. The near-infrared spectrum also has a vibration band at 5251 cm$^{-1}$ which is characteristic of a synthetic talc according to the invention and corresponds to the presence of water bonded to the talc at lamina edges.

Example 4—Preparation of a Composition Comprising Synthetic Mineral Particles According to the Invention The talc obtained in Example 3 is subjected to an anhydrous heat treatment or "annealing" for 5 hours at 550° C.

The synthetic talc composition of formula Si$_4$Mg$_3$O$_{10}$(OH)$_2$ so obtained after annealing was characterized by X-ray diffraction and near-infrared analysis.

The X-ray diffractogram of the synthetic talc composition of formula Si$_4$Mg$_3$O$_{10}$(OH)$_2$ so obtained is shown in FIG. 3 (curve 10).

The X-ray diffractogram of this talcose composition has diffraction lines corresponding to the diffraction lines of talc, and in particular the following characteristic diffraction lines:
 a plane (001) situated at a distance of 9.51 Å (I=98);
 a plane (002) situated at a distance of 4.70 Å (I=29);
 a plane (003) situated at a distance of 3.14 Å (I=100);
 a plane (060) situated at a distance of 1.52 Å (I=5).

The intensity I of the corresponding lines that is given is normalized relative to the most intense line of the diffractogram, the intensity of the most intense line being taken as 100.

Relative to the X-ray diffractogram of the synthetic talc before annealing, an increase in the intensity of the line (002) as compared with the intensity of the line (020) is observed, the line (020) then being coincident with the diffraction line characteristic of plane (002). There is also observed an increase in the intensities of lines (001), (002) and (003), that is to say, more generally, of the intensities of the lines (004 Such annealing therefore allows the crystallinity of the synthetic talc prepared to be increased further, the structural characteristics of that talc then being even more similar to those of a natural talc.

Such a talcose composition has, after annealing, a coherent domain of 28 laminae (using line (003)). The ratio between the intensity of the diffraction line characteristic of plane (001) and the intensity of the diffraction line characteristic of plane (003) is 0.98.

The near-infrared spectrum of the synthetic talc composition obtained is shown in FIG. 4 (curve 20). The near-infrared spectrum of the synthetic talc composition obtained after annealing has a vibration band at 7185 cm$^{-1}$ representative of the vibration of the $Mg_3$—OH bond of the talc. The intensity of this vibration band has increased as compared with the near-infrared spectrum of the synthetic talc before annealing, which indicates an increase in the crystallinity of the synthetic talc obtained. There is also observed a decrease in the intensity of the vibration band corresponding to the presence of water bonded to the talc at lamina edges (situated at 5273 cm$^{-1}$) as compared with the curve 13 of the synthetic talc before heat treatment, revealing a reduction in the number of molecules of water bonded to the talc at lamina edges during the annealing.

Example 5—Preparation of a Composition Comprising Synthetic Mineral Particles According to the Invention A hydrogel precursor of synthetic mineral particles is prepared according to the protocol described in Example 1.

The hydrogel obtained is subjected directly to a hydrothermal treatment at a temperature of 300° C. for 24 hours at a pressure of 80 bar (8 MPa) (saturation vapor pressure of the water in the reactor). The concentration of sodium acetate during the hydrothermal treatment is 4 mol/1.

The talcose composition that is recovered is then subjected to two successive cycles of washing with demineralized water and centrifugation and is finally dried by lyophilization for 72 hours.

The X-ray diffractogram of the synthetic talc composition of formula $Si_4Mg_3O_{10}(OH)_2$ so obtained is shown in FIG. 1 (curve 4).

The X-ray diffractogram of this talcose composition has diffraction lines corresponding to the diffraction lines of talc, and in particular the following characteristic diffraction lines:
 a plane (001) situated at a distance of 9.54 Å (I=100);
 a plane (002) situated at a distance of 4.73 Å (I=31);
 a plane (003) situated at a distance of 3.15 Å (I=96);
 a plane (060) situated at a distance of 1.52 Å (I=7).

It is observed that the line corresponding to the plane (002) has a higher intensity than the line corresponding to the plane (020), the diffraction line characteristic of a plane (020) being partially coincident with the diffraction line characteristic of a plane (002) and being present only in the form of a very slight shoulder.

Such a talcose composition has a coherent domain of 24 laminae (using line (003)). The ratio between the intensity of the diffraction line characteristic of plane (001) and the intensity of the diffraction line characteristic of plane (003) is 0.96.

The near-infrared spectrum of the synthetic talc composition obtained is shown in FIGS. 4 and 5 (curve 14). It has a vibration band at 7185 cm$^{-1}$ representative of the vibration of the $Mg_3$—OH bond of the talc. The near-infrared spectrum also has a vibration band at 5251 cm$^{-1}$ which is characteristic of a synthetic talc according to the invention and corresponds to the presence of water bonded to the talc at lamina edges.

Example 6—Preparation of a Composition Comprising Synthetic Mineral Particles According to the Invention A hydrogel precursor of synthetic mineral particles is prepared according to the protocol described in Example 1.

The hydrogel obtained is subjected directly to a hydrothermal treatment at a temperature of 300° C. for 10 days at a pressure of 80 bar (8 MPa) (saturation vapor pressure of the water in the reactor). The concentration of sodium acetate during the hydrothermal treatment is 4 mol/1.

The talcose composition that is recovered is then subjected to two successive cycles of washing with demineralized water and centrifugation and is finally dried by lyophilization for 72 hours.

The X-ray diffractogram of the synthetic talc composition of formula $Si_4Mg_3O_{10}(OH)_2$ so obtained is shown in FIG. 1 (curve 5).

The X-ray diffractogram of this talcose composition has diffraction lines corresponding to the diffraction lines of talc, and in particular the following characteristic diffraction lines:
 a plane (001) situated at a distance of 9.51 Å (I=92);
 a plane (002) situated at a distance of 4.73 Å (I=26);
 a plane (003) situated at a distance of 3.14 Å (I=100);
 a plane (060) situated at a distance of 1.52 Å (I=5).

It is observed that the line corresponding to the plane (002) has a higher intensity than the line corresponding to the plane (020), the diffraction line characteristic of a plane (020) being coincident with the diffraction line characteristic of a plane (002) and difficult to distinguish therefrom.

Such a talcose composition has a coherent domain of 34 laminae (using line (003)). The ratio between the intensity of the diffraction line characteristic of plane (001) and the intensity of the diffraction line characteristic of plane (003) is 0.81.

The near-infrared spectrum of the synthetic talc composition obtained is shown in FIG. 5 (curve 15). It has a vibration band at 7185 cm$^{-1}$ representative of the vibration of the $Mg_3$—OH bond of the talc. The near-infrared spectrum also has a vibration band at 5251 cm$^1$ which is characteristic of a synthetic talc according to the invention and corresponds to the presence of water bonded to the talc at lamina edges.

It is thus noted that, the more the duration of the hydrothermal treatment increases (as with an anhydrous heat treatment), the more the synthetic talc composition obtained is similar to a natural talc, in particular with regard to the values of coherent domains and the ratio between the intensity of the RX diffraction line characteristic of plane (001) and the intensity of the RX diffraction line characteristic of plane (003) (for a same hydrogel precursor and a constant hydrothermal treatment temperature).

It can thus be noted that the near-infrared spectra of the various synthetic talcs according to the invention are very similar to a near-infrared spectrum of a natural talc (curve 16, FIG. 5), with the exception of the vibration band between 5000 cm$^1$ and 5500 cm$^{-1}$ which, for a natural talc, does not have such a high intensity as for synthetic talcs according to the invention.

The invention can be the subject of many other applications and of different variants with respect to the embodiments and examples described above. In particular, said talcose composition can comprise phyllosilicate mineral particles in which different metals are situated at octahedral sites, such that in $(Si_xGe_{1-x})_4M_3O_{11}$, n'$H_2O$, M has the formula $(Co_{0.5}Ni_{0.5})$.

The invention claimed is:

1. A composition comprising synthetic mineral particles, wherein the composition has, in X-ray diffraction, the following characteristic diffraction lines:
   a plane (001) situated at a distance between 9.40 Å and 9.90 Å;
   a plane (002) situated at a distance between 4.60 Å and 4.80 Å;
   a plane (003) situated at a distance between 3.10 Å and 3.20 Å; and
   a plane (060) situated at a distance between 1.51 Å and 1.53 Å;
   the intensity of the diffraction line characteristic of the plane (002) being greater than the intensity of the signal corresponding to a plane (020) situated at a distance between 4.40 Å and 4.60 Å, and
   the ratio between the intensity of the diffraction line characteristic of the plane (001) and the intensity of the diffraction line characteristic of the plane (003) being from 0.60 to 1.50, and wherein the composition does not have, in X-ray diffraction, a diffraction line characteristic of a plane situated at a distance between 12.00 Å and 18.00 Å.

2. The composition according to claim 1, wherein said synthetic mineral particles are phyllosilicate mineral particles having at least one non-swelling phase formed of a stack of elementary lamellae, said elementary lamellae being constituted by an association of two tetrahedral layers situated on either side of an octahedral layer, and having the chemical formula $$(Si_xGe_{1-x})_4M_3O_{10}(OH)_2$$

wherein
   x is a real number of the interval [0; 1], and
   M is at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$, each y (i) representing a real number of the interval [0; 1], such that $$\sum_{i=1}^{8} y(i) = 1.$$

3. The composition according to claim 1, wherein the composition has, in near-infrared, a vibration band situated between 5000 cm$^{-1}$ and 5500 cm$^{-1}$, corresponding to the presence of water bonded at lamina edges.

4. The composition according to claim 2, wherein said composition has, in near-infrared, a vibration band situated between 5000 cm$^{-1}$ and 5500 cm$^{-1}$, corresponding to the presence of water bonded at lamina edges.

5. The composition according to claim 2, wherein said composition has, in near-infrared, a vibration band situated between 5200 cm$^{-1}$ and 5280 cm$^{-1}$, corresponding to the presence of water bonded at lamina edges.

6. The composition according to claim 2, wherein said composition has, in near-infrared, a vibration band situated at 7185 cm$^{-1}$.

7. The composition according to claim 1, wherein said synthetic mineral particles are silicate mineral particles.

8. The composition according to claim 1, wherein said synthetic mineral particles are phyllosilicate mineral particles.

9. The composition according to claim 2, wherein said synthetic mineral particles have the chemical formula $Si_4Mg_3O_{10}(OH)_2$.

10. The composition according to claim 2, wherein the elementary particles of said synthetic mineral particles have a particle size in a range between 20 nm and 100 nm.

11. The composition according to claim 1, wherein the composition is prepared by a process in which a hydrogel precursor of the synthetic mineral particles is prepared by a coprecipitation reaction between
   at least one compound comprising sodium metasilicate, and
   at least one compound comprising at least one metal element,
   wherein the coprecipitation reaction takes place in the presence of at least one carboxylate salt of the formula $R_2$—COOM', wherein M' is Na or K, and $R_2$ is H or an alkyl group having 1 to 4 carbon atoms, and
   wherein said carboxylate salt of the formula $R_2$—COOM' is added before the coprecipitation reaction takes place.

12. The composition according to claim 11, wherein said at least one compound comprising at least one metal element is a dicarboxylate salt of the formula $M(R_1$—COO$)_2$,
   wherein $R_1$ is H or an alkyl group having 1 to 4 carbon atoms, and
   M is at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$, each y (i) representing a real number of the interval [0; 1], such that $$\sum_{i=1}^{8} y(i) = 1.$$

13. The composition according to claim 12, wherein $R_1$ and $R_2$ are each independently selected from the group consisting of $CH_3$—, $CH_3$—$CH_2$—, and $CH_3$—$CH_2$—$CH_2$—.

14. The composition according to claim 12, wherein the groups of $R_1$ and $R_2$ are identical.

15. The composition according to claim 11, wherein after said coprecipitation reaction, said hydrogel precursor is then subjected to a hydrothermal treatment to obtain said synthetic mineral particles.

16. The composition according to claim 15, wherein said hydrothermal treatment is carried out at a temperature of from 150° C. to 400° C.

17. The composition according to claim 15, wherein said hydrothermal treatment is carried out at a pressure of from 5 bar to 200 bar.

18. The composition according to claim 11, wherein said hydrogel precursor of said synthetic mineral particles is a hydrogel of the formula $$(Si_xGe_{1-x})_4M_3O_{11}, n'H_2O,$$

wherein
   x is a real number of the interval [0; 1], and
   n' is a number of molecule(s) of water associated with said hydrogel precursor.

19. The composition according to claim 11, wherein said at least one carboxylate salt of the formula $R_2$—COOM' is present in an amount so as to give, based on silicon, a molar ratio $R_2$—COOM'/Si of from 0.1 to 9.

20. The composition according to claim 2, wherein said composition is prepared by a process comprising:
  (i) preparing a hydrogel precursor of synthetic mineral particles by a coprecipitation reaction comprising:
    (a) providing a first solution comprising at least one sodium metasilicate and at least one carboxylate salt of the formula $R_2$—COOM', wherein
      M' is Na or K, and
      $R_2$ is H or an alkyl group having 1 to 4 carbon atoms; and
    (b) rapidly adding to the first solution a second solution comprising at least one dicarboxylate salt of the formula $M(R_1\text{—COO})_2$, wherein
      $R_1$ is H or an alkyl group having 1 to 4 carbon atoms, and
      M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$, each y(i) representing a real number of the interval [0; 1], such that $$\sum_{i=1}^{8} y(i) = 1;$$

and
  (ii) after said coprecipitation reaction, subjecting said hydrogel precursor to a hydrothermal treatment to obtain said synthetic phyllosilicate mineral particles.

* * * * *